(12) United States Patent
Sullivan

(10) Patent No.: US 6,722,040 B2
(45) Date of Patent: Apr. 20, 2004

(54) ADAPTER FOR A WEED EATER

(76) Inventor: Donald Joe Sullivan, 317 Davis St., Sandwich, IL (US) 60548

( * ) Notice: Subject to any disclaimer, the term of this patent is extended or adjusted under 35 U.S.C. 154(b) by 0 days.

(21) Appl. No.: 10/046,307

(22) Filed: Jan. 16, 2002

(65) Prior Publication Data

US 2003/0131481 A1 Jul. 17, 2003

(51) Int. Cl.⁷ .............................................. A01D 34/416
(52) U.S. Cl. ......................................... 30/276; 30/347
(58) Field of Search ................................... 30/276, 347

(56) References Cited

U.S. PATENT DOCUMENTS

| | | | | |
|---|---|---|---|---|
| 4,148,141 A | * | 4/1979 | Hoff | 30/276 |
| 4,189,830 A | * | 2/1980 | Pittinger, Jr. | 30/276 |
| 4,599,796 A | * | 7/1986 | Baba | 30/276 |
| 5,433,006 A | * | 7/1995 | Taguchi | 30/276 |
| 5,836,227 A | * | 11/1998 | Dees, Jr. et al. | 30/276 |
| 5,906,051 A | * | 5/1999 | Nannen | 30/276 |

* cited by examiner

Primary Examiner—Hwei-Siu Payer
(74) Attorney, Agent, or Firm—Bacon & Thomas, PLLC

(57) ABSTRACT

An adapter for a weed eater is movably connected to a lower side of a spinning spool of a weed eater. The adapter when installed to the weed eater has a cord equal in height to weeds after they are cut. A center of the seat of the adapter has a penetrating hole. A stud penetrates through the penetrating hole of the adapter so as to lock the spinning spool of the weed eater. Since the diameter of the penetrating hole is larger than the diameter of the stud, the adapter and the spinning spool are movable connected to one another, and the adapter can move along the stud. The weight of the weed eater can be transferred to a ground so as to reduce the burden of the user and the weed eater can avoid stones as it is trimming weeds.

11 Claims, 4 Drawing Sheets

ADAPTER FOR A WEED EATER

BACKGROUND OF THE INVENTION (a) Field of the Invention

The present invention relates to adapters of weed eaters, and particularly to an adapter has a predetermined height and is pivotally installed to a lower side of a spinning spool of a weed eater.

(b) Description of the Prior Art

U.S. Pat. No. 5,644,844 discloses a prior art weed eater. The front end of the weed eater has an electromotive weed eating means. A handle is installed at a distal and a middle ends of the body of the weed eating means. The handle at the distal end is installed with an operation switch for controlling the ON/OFF of the electromotive weed eating means. The weed eating means has a motor installed therein for driving a spinning spool at a bottom. By the trimming cords at the spinning spool rotating in a high speed, it is formed with a round trimmed surface by the eccentric force thereof. In using, the weed eater is held by two hands or carried on the shoulder and the spinning spool dangles above meadow with a predetermined height. However, for a long operation time, the eyes, hands, shoulders and neck of the operator will feel uneasy. Furthermore, the height of the trimmed weeds can not be well controlled. In the prior art, as the trimming rope is consumed, the user lifts the weed eater and then places it on the ground for flapping it and the weed eater is touched with the ground. Then an internal means for unwinding the cords is actuated to adjust the length of the exposed cords. Moreover, the effect trimming area of the weed eater is retained.

SUMMARY OF THE INVENTION

Accordingly, the primary object of the present invention is to provide an adapter of a weed eater, wherein an adapter is movably connected to a lower side of a spinning spool of a weed eater. The installed adapter sets the trimming cords at a height equally to the weeds after trimmed. Moreover, the weed eater can be placed on the meadow and moves along the ground. As it is driven by a motor, the cords will form a round trimmed surface by the eccentric force of the high speed rotation from the spool. Therefore, the trimming cords can be dangled at a predetermined height for trimming the weeds. As a consequence, the muscles of eyes, hands, shoulders and neck of the operator will not feel uneasy in trimming weeds.

Another object of the present invention is to provide an adapter of a weed eater, wherein the adapter is installed to a lower end of a spinning spool at a bottom of a weed eater so that the assembly of the adapter need not require any auxiliary tool. It is only necessary to slot the rectangular head of a stud into a rectangular hole of the adapter. Thereby, turning the adapter can cause the screw be fixed to a rotary shaft of a weed eater.

Another object of the present invention is to provide an adapter of a weed eater, wherein the adapter with a round seat of the present invention has a bottom being a round plane. The diameter of the round plane has a diameter larger than 3 inches. The periphery of the buckle thereof has a proper cambered shape (through an arc radius larger than ¼ inches). Thereby, as the weed eater is moved, since the bottom of the adapter has a larger contact area with the ground, as the weed eater is operated, it may be retained vertically with the ground so that the trimmed weeds have the same height. The periphery of the cambered shape cause the adapter can be pushed into an uneven ground. When it contacts small stones, the adapter may rotate so as to duck the stones. No meadow is harmed.

A further object of the present invention is to provide an adapter of a weed eater, wherein adapter has a platform at a center thereof. The diameter of the platform is smaller than one and five eight inches, and the height thereof is preferably smaller than 3/16 inches. When the adapter is fixed to the bottom of a weed eater, the platform helps aligning the adapter to the concave recessed shape of the spool and makes it easier to align and couple the screw to the shaft of the weed eater. Also the gap between the contact surfaces of the adapter and the spool will be minimized so that undesired objects will not enter into the rotary shaft to affect the normal operation of the weed eater. Based on the same consideration, a plug can be used to seal the lower end of the penetrating hole of the adapter so as to retain the smoothness of the bottom of the adapter and thus no undesired object can intrude into the adapter.

A further object of the present invention is to provide an adapter of a weed eater, wherein the rectangular hole or hole of other shapes has a depth so that a screw may move through ¾ inches along the rotary shaft. Especially, in trimming weeds, the user flaps the weed eater onto the ground. Thereby, the adapter and spool move upward so that the rope in the winding means can be released to adjust the length thereof. As a result, the consumption of the rope in cutting weeds can be compensated and the effective trimming area of the weed eater can be retained.

The various objects and advantages of the present invention will be more readily understood from the following detailed description when read in conjunction with the appended drawing.

DETAILED DESCRIPTION OF THE PREFERRED EMBODIENTS

Figure 1:
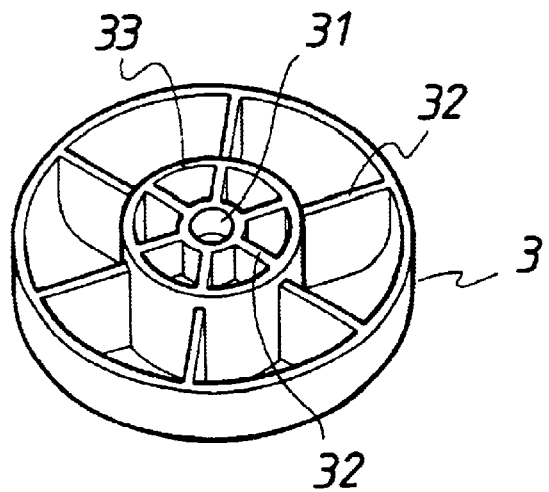
FIG. 1 is a perspective view of the present invention.
Figure 2:
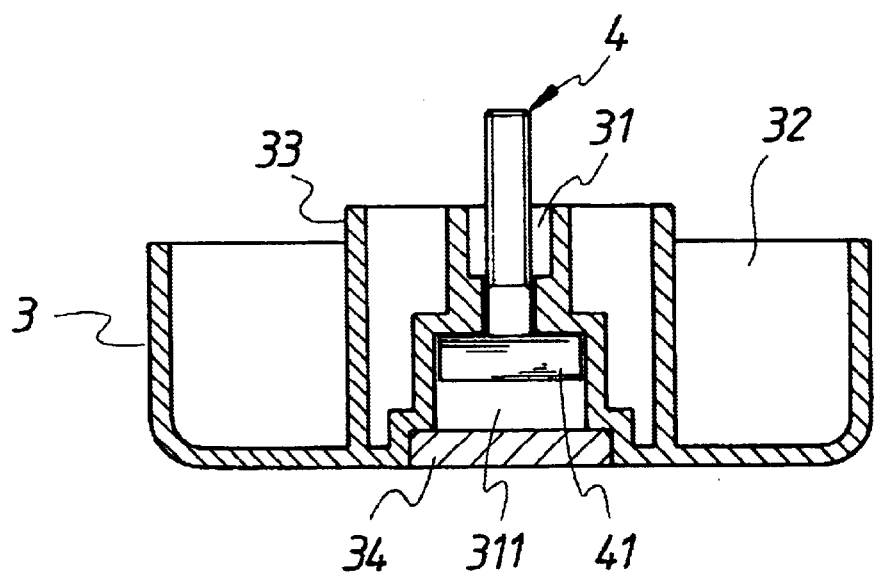
FIG. 2 is a cross sectional view of the present invention.
Figure 3:
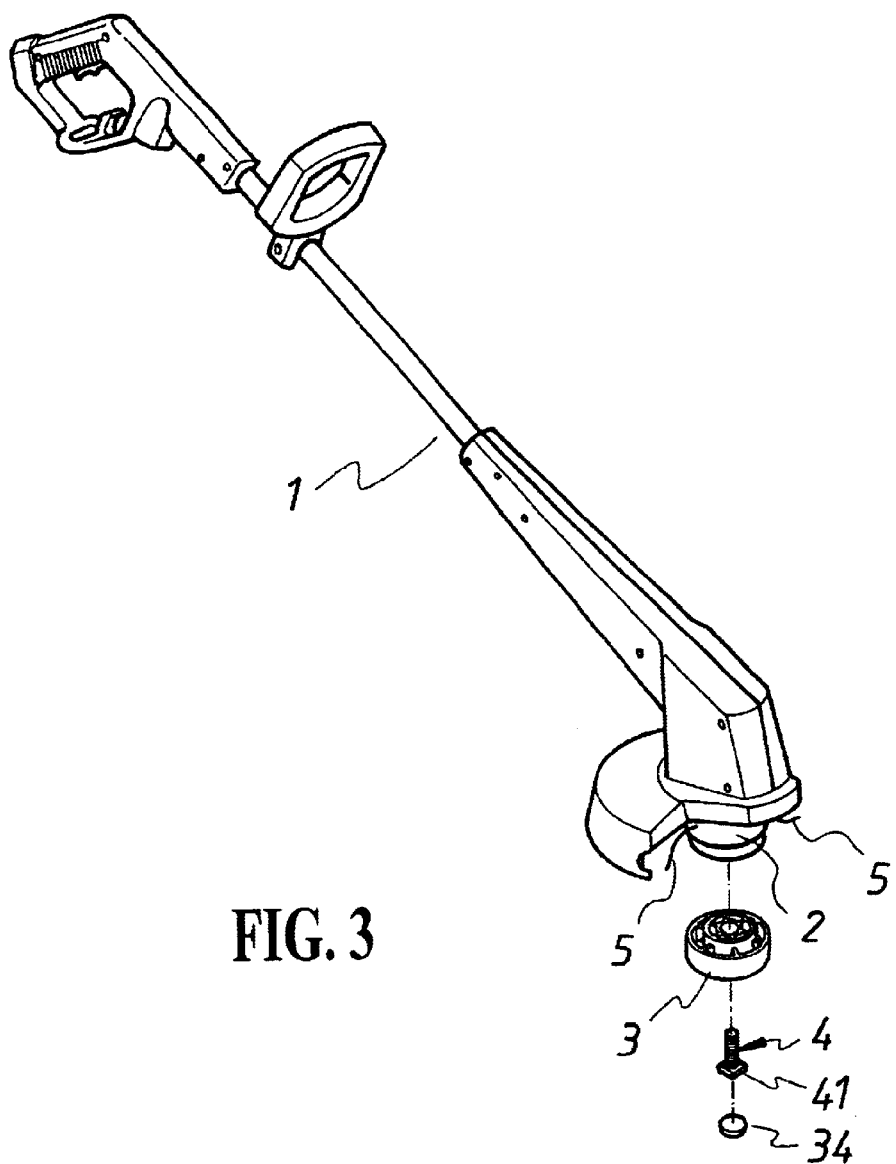
FIG. 3 is an assembled exploded view of the weed eater of the present invention.
Figure 4:
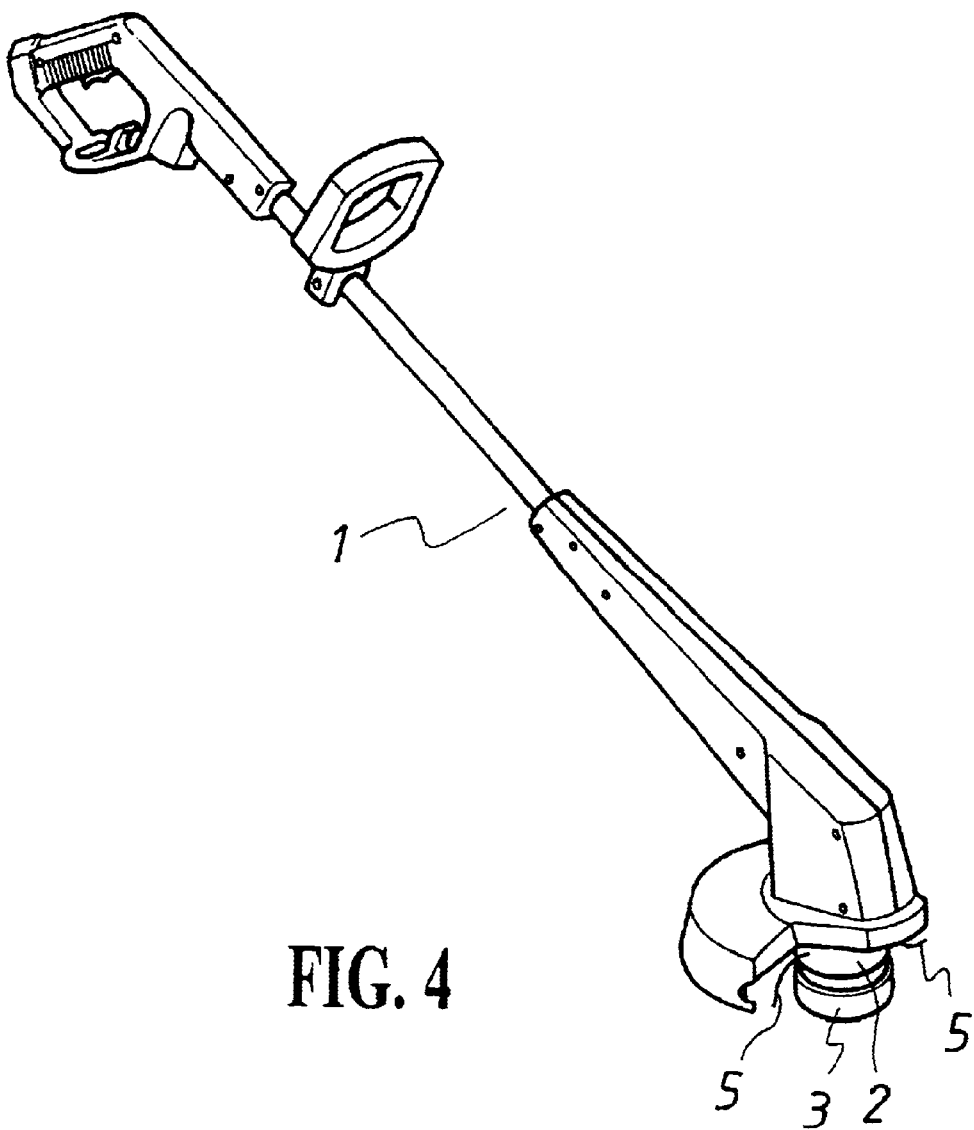
FIG. 4 is a perspective view of the weed eater of the present invention.

Referring to FIGS. 1 to 3, the adapter of a weed eater of the present invention is illustrated. An adapter 3 is movably connected to a lower side of a spinning spool of a weed eater 1. The adapter 3 has a height which when installed to the weed eater sets the height of the cords equally to that of the weeds after being trimmed. In general, the trimmed meadow height is about 2.25 inches to 2.5 inches. A penetrating hole 31 is formed at a center of the seat. The seat may be a solid seat or a hollow seat (not shown) and may be made by any material. If the seat is a hollow body, an enhancing rib 32 can be installed in the seat. The enhancing rib 32 may be formed by a plurality of winding or has a radiating shape for enhancing the structure thereof.

In above mentioned adapter 3, a stud 4 penetrates through the penetrating hole 31 of the adapter 3 so as to lock to the spinning spool 2 of the weed eater 1 (referring to FIG. 2). Since the diameter of the penetrating hole 31 is larger than the diameter of the stud 4, as the weed eater flaps onto the ground, the adapter 3 and the spinning spool 2 can be pushed upwards integrally, while the stud 4 can be slid down along an axis so that a winding rope can be released.

Figure 5:
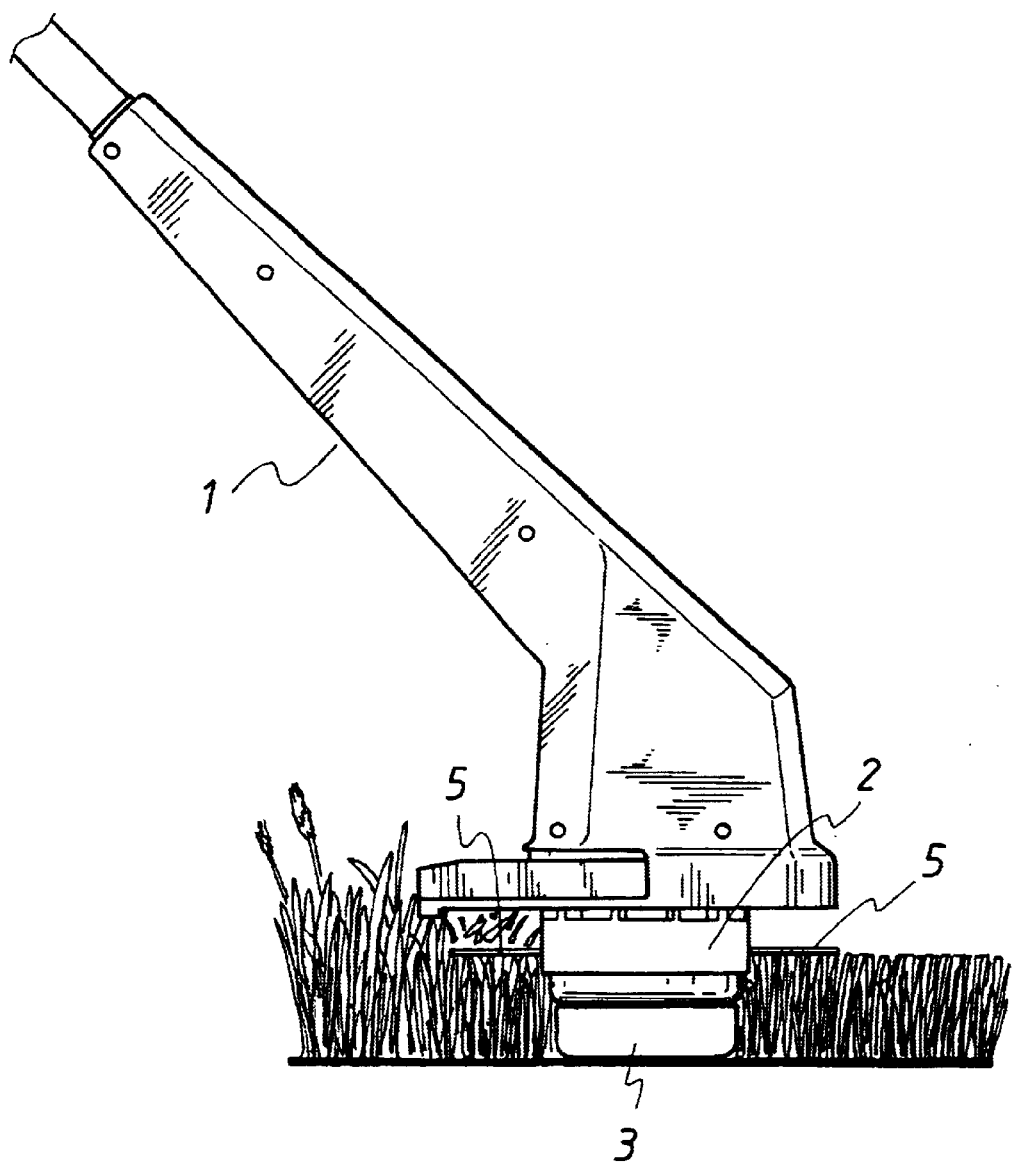
FIG. 5 is a schematic view showing the operation of the present invention.

The adapter 3 is slidingly installed to a lower side of the spinning spool 2. Thus the weed eater 1 can be placed on a meadow and moves along the meadow so that the user may operate it easily. Moreover, when installed the adapter to the weed eater, the height of the adapter 3 will set the cords height which is the height of the trimmed meadow. As it is driven by a motor, the rope will form a round trimmed surface by the eccentric force from the high speed rotation of the spool. Therefore, the adapter 3 can be dangled along the meadow for trimming the weeds (referring to FIG. 5).

The adapter 3 can be a round seat and is connected to the weed eater 1. If the adapter 3 touches small stones as it cuts weeds in movement, it can avoid the stones by automatically rotating. Therefore, such operation is successful. No meadow is damaged and moreover, the trimmed weeds have the same height.

The stud 4 has a head 41 of rectangular shape or specific shape. The penetrating hole 31 of the adapter 3 corresponds to a rectangular hole 311 or a groove of a specific shape (referring to FIG. 2). There, the stud 4 with the rectangular head 41 may be embedded into the rectangular hole 311 of the adapter 3. As a result, the adapter 3 can be easily and conveniently fixed to the rotary shaft of the weed eater 1. No tool is necessary in assembly.

The adapter 3 with a round seat of the present invention has a bottom being a round plane. The diameter of the round plane has a diameter larger than 3 inches. The periphery of the buckle thereof has a proper cambered shape (through an arc radius larger than ¼ inches). Thereby, as the weed eater 1 is moved, since the bottom of the adapter 3 has a larger contact area with the ground, as the weed eater 1 is operated, it may be retained vertically with the ground so that the trimmed weeds have the same height. The periphery of the cambered shape permits the adapter 3 to be pushed into an uneven ground. When it contacts small stones, the adapter 3 may rotate so as to avoid the stones. No meadow is harmed.

Above mentioned adapter 3 has a platform 33 at a center thereof. The diameter of the platform 33 is smaller than one and five eight inches, and the height thereof is preferably smaller than 3/16 inches. When the adapter 3 is fixed to a bottom of a weed eater 1, the platform 33 helps align the adapter 3 to the concave recessed shape of the spool 2 and makes it easier to align and couple the screw or stud 4 to the shaft of the weed eater 1. Also the gap between the contact surfaces of the adapter 3 and the spool 2 will be minimized so that undesired objects will not enter into the rotary shaft to affect the normal operation of the weed eater 1. Based on the same consideration, a plug 34 can be used to seal the lower end of the penetrating hole 31 of the adapter 3 so as to retain the smoothness of the bottom of the adapter 3 and thus no undesired object can intrude into the adapter 3. The rectangular hole 311 or hole of other shapes has a depth so that a screw or stud 4 may move through ¾ inches along the rotary shaft. Especially, in trimming weeds, the user flaps the weed eater 1 slightly onto the ground. Thereby, the adapter 3 and the spool 2 presses upwards along the shaft of the weed eater 1. Then the cord release mechanism is actuated and the cords 5 in the winding means can be released to adjust the length thereof. As a result, the consumption of the cords 5 in trimming weeds can be compensated and the effective trimming area of the weed eater 1 can be retained.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An adapter for a weed eater having a spinning spool with cords attached thereto, the adapter comprising:

a housing having upper and lower sides, and a sidewall, the housing including a central hole along the central axis of the housing, the central hole having upper and lower sections, the cross-sectional area of the lower section being larger than that of the upper section;

a stud having an elongated portion and a head portion;

the elongated portion of the stud is attached to a lower surface of the spinning spool through the central hole of the housing of the adapter and the head portion of the stud is slidable within the lower section of the central hole of the housing, thereby permitting the housing to slide along the elongated portion of the stud; and wherein the height of the cords attached to the spinning spool are raised from the ground by the sidewall of the housing.

2. The adapter for a weed eater as claimed in claim 1, wherein the cords attached to the spinning spool are positioned between 2.25 to 2.5 inches from the ground.

3. The adapter for a weed eater as claimed in claim 2, wherein the housing of the adapter includes reinforcing rib structures.

4. The adapter for a weed eater as claimed in claim 1, wherein the adapter comprises a solid body or a hollow body.

5. The adapter for a weed eater as claimed in claim 1, wherein the adapter has a round seat.

6. The adapter for a weed eater as claimed in claim 1, wherein the head portion of the stud and the cross-sectional area of the lower section of the central hole of the housing are rectangular.

7. The adapter for a weed eater as claimed in claim 1, wherein the adapter comprises a bottom having a round plane, the diameter of the round plane has a diameter larger than 3 inches; and a cambered outer edge.

8. The adapter for a weed eater as claimed in claim 1, wherein a center of the adapter has a platform.

9. The adapter for a weed eater as claimed in claim 1, wherein the adapter comprises a platform at a center thereof, the diameter of the platform is smaller than 1 and 5/8 inches and a height thereof is smaller than 3/16 inch.

10. The adapter for a weed eater as claimed in claim 1, further comprising a plug that plugs the lower section of the central hole of the housing to retain the smoothness of the bottom of the adapter and prevent entry of debris into the adapter.

11. The adapter for a weed eater as claimed in claim 1, wherein the stud is a screw.

* * * * *